(12) United States Patent
Zauhar et al.

(10) Patent No.: US 10,544,807 B2
(45) Date of Patent: Jan. 28, 2020

(54) SLIDE ON FLUSH MOUNT BRACKET WITH CAPTIVE FASTNERS

(71) Applicant: Chien Luen Industries Co., Ltd., Inc., Oakland Park, FL (US)

(72) Inventors: Zachary Zauhar, Dania Beach, FL (US); Eliezer Rivera, Plantation, FL (US); Tien S. Lowe, Cooper City, FL (US)

(73) Assignee: CHIEN LUEN INDUSTRIES CO., LTD., INC., Oakland Park, FL (US)

( * ) Notice: Subject to any disclaimer, the term of this patent is extended or adjusted under 35 U.S.C. 154(b) by 394 days.

(21) Appl. No.: 15/343,702

(22) Filed: Nov. 4, 2016

(65) Prior Publication Data

US 2017/0051759 A1 Feb. 23, 2017

Related U.S. Application Data

(63) Continuation of application No. PCT/US2015/032211, filed on May 22, 2015.
(Continued)

(51) Int. Cl.
*B42F 13/00* (2006.01)
*F04D 29/64* (2006.01)
(Continued)

(52) U.S. Cl.
CPC ......... *F04D 29/646* (2013.01); *F04D 25/088* (2013.01); *H02K 5/24* (2013.01); *H02K 7/14* (2013.01)

(58) Field of Classification Search
CPC .... F04D 29/646; F04D 25/088; F04D 29/601; H02K 5/24; H02K 7/14
(Continued)

(56) References Cited

U.S. PATENT DOCUMENTS

| 2,532,528 | A | * | 12/1950 | Zuley | ..................... F21V 21/112 248/343 |
| 2,771,259 | A |   | 11/1956 | Laystrom | |

(Continued)

OTHER PUBLICATIONS

Chien Luen Industries Co., Ltd., Inc., PCT Application No. PCT/US2015/032211 filed May 22, 2015, Notification of Transmittal of the International Search Report and the Written Opinion of the International Searching Authority dated Aug. 26, 2015, 16 pages.

*Primary Examiner* — Gwendolyn W Baxter
(74) *Attorney, Agent, or Firm* — Brian S. Steinberger; Hilary F. Steinberger; Law Offices of Brian S. Steinberger, P.A.

(57) ABSTRACT

Devices, apparatus, mechanisms, systems and methods for flush mounted fans such as hugger fans for easy mounting by pre-attaching a bracket on a motor to a ceiling mounted plate by a hook, the plate having noise isolation pads. Raised alignment tabs and female receptacles on the ceiling plate and motor bracket for easily aligning the bracket to the ceiling plate, along with captive fasteners to attach the motor bracket to the ceiling plate. The alignment tabs allow the installer to position the bracket to the plate by sliding the bracket against the plate so that captive fasteners on the bracket adjacent to the alignment tabs are aligned with fastener holes on the plate. Finally, the installer can easily screw the captive fasteners into the holes for an easy to install, secure and wobble free installation between the motor bracket and the ceiling plate.

20 Claims, 8 Drawing Sheets

Related U.S. Application Data (60) Provisional application No. 62/002,320, filed on May 23, 2014.

(51) Int. Cl.
   *F04D 25/08* (2006.01)
   *H02K 5/24* (2006.01)
   *H02K 7/14* (2006.01)

(58) Field of Classification Search
   USPC ......... 248/342, 343, 344; 416/146 R, 210 R, 416/244 R
   See application file for complete search history.

(56) References Cited

U.S. PATENT DOCUMENTS

| | | | |
|---|---|---|---|
| 2,965,180 A | 12/1960 | Killam | |
| 4,050,771 A | 9/1977 | Watson | |
| 4,121,495 A | 10/1978 | Malo | |
| 4,511,310 A | 4/1985 | Pearce | |
| 4,766,806 A | 8/1988 | Tomiser | |
| 4,850,799 A | 7/1989 | Bucher | |
| 5,034,869 A * | 7/1991 | Choi | F21S 8/04 248/343 |
| 5,180,284 A | 1/1993 | Monrose | |
| 5,397,206 A | 3/1995 | Sihon | |
| 5,462,412 A | 10/1995 | Scofield | |
| 5,542,819 A | 8/1996 | Bucher | |
| 5,873,701 A | 2/1999 | Shiu | |
| 5,927,945 A | 7/1999 | Chen | |
| 5,944,486 A | 8/1999 | Hodgkins | |
| 5,944,487 A | 8/1999 | Pearce | |
| 5,947,685 A | 9/1999 | Yu | |
| 5,951,197 A | 9/1999 | Wu | |
| 5,954,449 A | 9/1999 | Wu | |
| 5,980,353 A | 11/1999 | Wu | |
| 6,010,306 A | 1/2000 | Bucher | |
| 6,027,309 A | 2/2000 | Rawls | |
| 6,027,310 A | 2/2000 | Kerr | |
| 6,039,540 A | 3/2000 | Wu | |
| 6,095,753 A | 8/2000 | Hsu | |
| 6,139,276 A | 10/2000 | Blateri | |
| 6,171,062 B1 | 1/2001 | Bucher | |
| 6,210,117 B1 | 4/2001 | Bucher | |
| 6,352,411 B1 | 3/2002 | Bucher | |
| 6,726,169 B1 * | 4/2004 | Tseng | F04D 29/601 248/343 |
| 7,168,670 B2 | 1/2007 | Liang | |
| 7,300,248 B2 * | 11/2007 | Wang | F04D 25/088 248/343 |
| 7,396,210 B2 | 7/2008 | Bucher | |
| 7,540,461 B2 | 6/2009 | Liang | |
| 8,007,238 B2 * | 8/2011 | Yao | F04D 29/60 416/146 R |
| 8,418,981 B1 * | 4/2013 | Lowe | F04D 29/601 248/222.52 |
| 9,453,517 B1 * | 9/2016 | Burns | F04D 25/088 |
| 2006/0278766 A1 * | 12/2006 | Wang | F04D 25/088 248/74.1 |
| 2010/0226784 A1 | 9/2010 | Yao | |
| 2011/0188962 A1 | 8/2011 | Joyce | |

* cited by examiner

SLIDE ON FLUSH MOUNT BRACKET WITH CAPTIVE FASTNERS

This application is a Continuation of PCT Application PCT/US2015/032211 filed May 22, 2015, which claims the benefit of priority to U.S. Provisional Patent Application Ser. No. 62/002,320 filed May 23, 2014. The entire disclosure of each of the applications listed in this paragraph are incorporated herein by specific reference thereto.

FIELD OF INVENTION

This invention relates to ceiling fans, and in particular to devices, mechanisms, apparatus, systems, and methods for mounting flush mount fans to ceilings using captive fasteners, alignment tabs and rubber isolation pads to reduce noise.

BACKGROUND AND PRIOR ART

Ceiling fan installations is often difficult since installers will need to have their hands raised above their head while supporting heavy components such as the ceiling fan blades, motor, motor housing, and the like. Installations often will take place with the installer being perched on a ladder which also adds to the requirement of the installer having to maintain their balance while doing the installation.

For flush mounted fans, such as hugger fans, the housings covering the ceiling fan motor must be fastened often by fasteners, such as but not limited screws, and the like, into a ceiling mounted plate. The combination of having to hold a screw driver over one's head with loose screw fasteners while supporting a motor housing with or without a heavy motor is tedious and time consuming. Furthermore, it is potentially dangerous if the housing with or without the motor happens to fall.

Furthermore, the screw type fasteners will tend to fall out during installation which causes the installer to have to repeat the attempts to mount the fan. Falling screws will often become lost so that additional screw type fasteners must be used, which adds additional time and material expense to the installation of the fan.

Additionally, the current screw type fasteners being used between the motor bracket and ceiling plate are often not secure connections which can loosen and result in a fan that can wobble during operation.

Still furthermore, the traditional practice of directly attaching metal plates with metal screw type fasteners, can create undesirable noise effects, when the ceiling fan is running in both forward and rearward directions.

Thus, the need exists for solutions to the above problems with the prior art.

SUMMARY OF THE INVENTION

A primary objective of the present invention is to provide devices, mechanisms, apparatus, systems, and methods for mounting flush mount fans to ceilings using captive fasteners, alignment tabs and rubber isolation pads to reduce noise.

A secondary objective of the present invention is to provide devices, mechanisms, apparatus, systems, and methods of mounting a ceiling fan motor housing to a ceiling attached plate that eliminates using loose fasteners such as screws, and the like.

A third objective of the present invention is to provide devices, mechanisms, apparatus, systems, and methods of mounting a ceiling fan motor housing to a ceiling attached plate that substantially reduces the installation time of mounting a ceiling fan motor.

A fourth objective of the present invention is to devices, mechanisms, apparatus, systems, and methods of mounting a ceiling fan motor housing to a ceiling attached plate that is easier, quicker and more safe to install than traditional methods of using fasteners to mount a ceiling fan motor.

A fifth objective of the present invention is to provide devices, mechanisms, apparatus, systems, and methods of mounting a ceiling fan motor housing to a ceiling attached plate by easily aligning ceiling fan motor mount plate onto the ceiling attached plate and screwing the captive fasteners in place.

A seventh objective of the present invention is to provide devices, mechanisms, apparatus, systems, and methods of mounting a ceiling fan motor housing to a ceiling attached plate that allows for an easier and more secure installation.

An eighth objective of the present invention is to provide devices, mechanisms, apparatus, systems, and methods of mounting a ceiling fan motor housing to a ceiling attached plate having alignment tabs that align with the motor bracket to create a secure, wobble free connection.

A ninth objective of the present invention is to provide devices, mechanisms, apparatus, systems, and methods of mounting a ceiling fan motor housing to a ceiling attached plate having pre-installed captive fasteners, such as screws in the motor bracket for easier installation.

An embodiment system for flush mounting a ceiling fan motor to a ceiling plate, can include a plate mounted to a ceiling having a plurality of fastener holes, and a bracket attached to a ceiling fan motor, the bracket having a plurality of captive fasteners, wherein aligning the captive fasteners with the fastener holes, allows for attaching the bracket to the plate by rotating the captive fasteners into the fastener holes.

The plate can include the plurality of the fastener holes adjacent to a perimeter edge of the plate, and the plurality of captive fasteners is adjacent to a perimeter of the bracket.

The system can include alignment tabs and receptacles for aligning the bracket with the plate so that the captive fasteners are aligned with the fastener holes.

The alignment tabs can include raised portions adjacent to the captive fasteners on an upper surface of the bracket, which are mateable with indentation portions underneath the plate.

The alignment tabs can be underneath the plate, which are mateable with the female receptacles are on the upper surface of the bracket, The system can include a hook on the plate and a hanging slot on the bracket for allowing the bracket to hang from the ceiling mounted plate.

The system can include a hook on the bracket and a hanging slot on the plate for allowing the bracket to hang from the ceiling mounted plate.

The captive fasteners can include screws. The captive fasteners can be bolts.

The system can include an isolation pad on the ceiling mounted plate for providing noise isolation between the plate and a ceiling attachment point for decreasing noise when operating the ceiling fan.

The plate can include keyhole slots for mounting the plate to the ceiling attachment point, with the isolation pad about the keyhole slots.

A method of flush mounting a ceiling fan motor to a ceiling mounted plate, can include the steps of providing a plate mounted to a ceiling having a plurality of fastener holes, providing a motor bracket with a plurality of captive fasteners, aligning the motor bracket to the plate so that the captive fasteners are aligned to the fastener holes, and attaching the motor bracket to the ceiling mounted plate by rotating the captive fasteners into the fastener holes.

The method can include the step of hooking the motor bracket to the ceiling mounted plate with a hook and a slot.

The step of providing the motor bracket with the plurality of captive fasteners, can include the step of providing screws as the captive fasteners.

The step of providing the motor bracket with the plurality of captive fasteners, can include the step of providing bolts as the captive fasteners.

The aligning step can include the steps of providing alignment tabs an upper surface of the motor bracket, and providing mateable alignment receptacles underneath the ceiling mounted plate; and aligning the tabs into respective receptacles.

The aligning step can include the step of sliding the bracket against the plate to align the bracket captive fasteners with the fastener holes.

The aligning step can include the steps of providing alignment tabs on a lower surface of the ceiling plate, and providing mateable alignment receptacles on the bracket.

The aligning step can include the step of sliding the bracket against the plate to align the bracket captive fasteners with the fastener holes.

The method can include the steps of providing keyhole slots in the ceiling plate and providing an isolation pads about the keyhole slots to decrease nose when the ceiling mounted plate is attached to a ceiling attachment fastener.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1A:
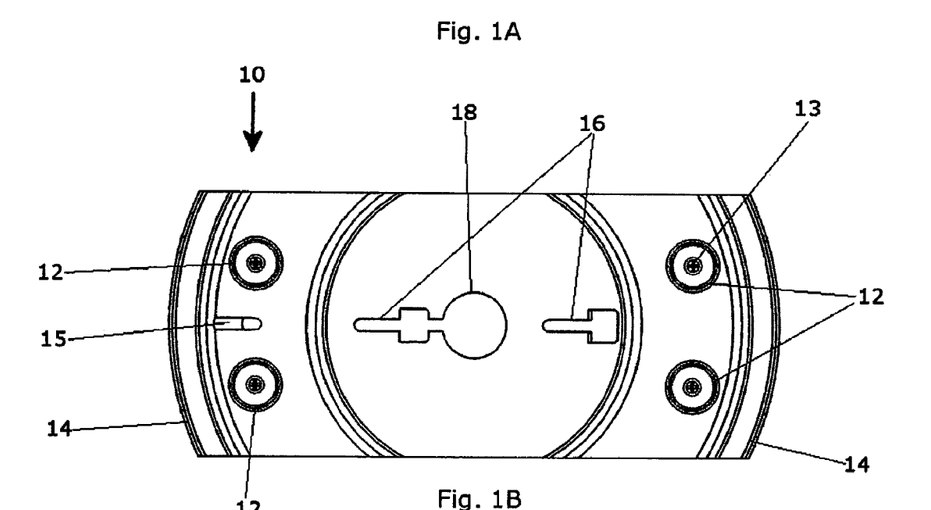
FIG. 1A is a bottom view of a novel ceiling mount plate.
Figure 1B:
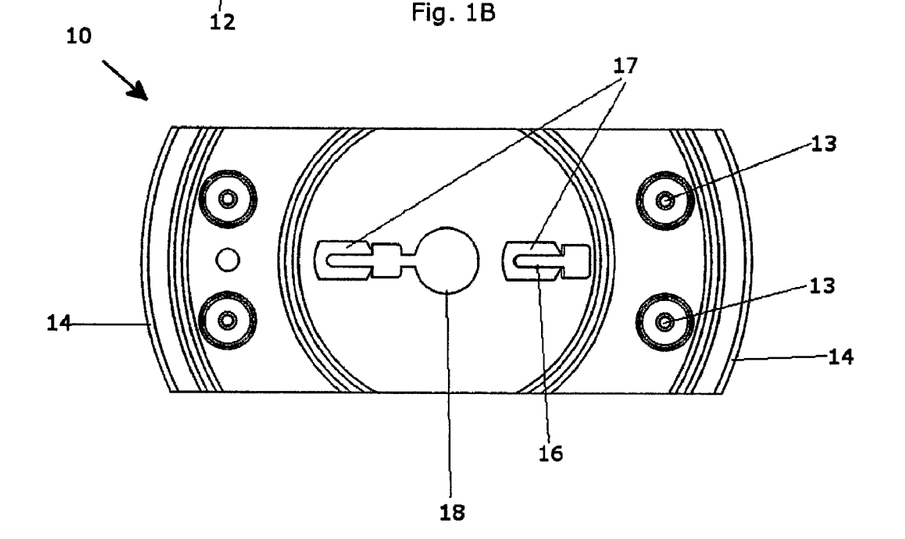
FIG. 1B is a top view of the ceiling mount plate of FIG. 1A.

A list of the components will now be described.
2 ceiling
5 downwardly protruding fasteners from ceiling junction box
10 ceiling mount plate
12 alignment receptacles(indentations) for raised tabs
13 through-hole(s) for captive fastener(s)
14 downwardly protruding rim edge
15 hook
16 keyhole slot(s) to attach to heads of fasteners in a ceiling mount
17 noise isolation pads
18 central opening for power lines(electrical conductors)
20 motor bracket
21 horizontal rim
22 raised alignment tabs to fit into receptacles(indentions)
23 captive fastener(s)(such as pre-installed screws, bolts, and the like)
25. slot for hanging hook
30 remote receiver control in motor bracket
40 motor extending below motor bracket
50 motor housing FIG. 1A is a bottom view of a novel ceiling mount plate 10. FIG. 1B is a top view of the ceiling mount plate 10 of FIG. 1A.

Figure 2A:
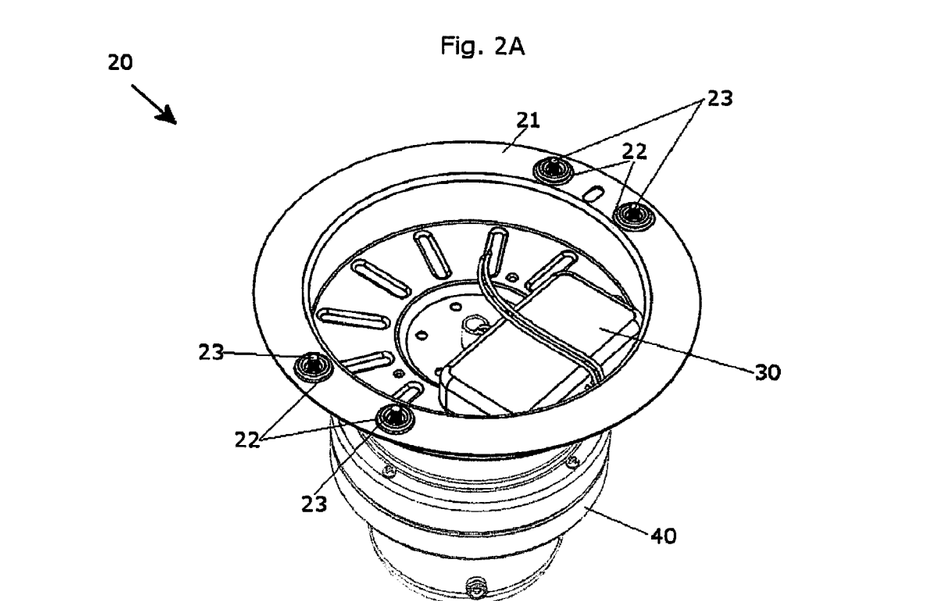
FIG. 2A is an upper perspective view of a novel bracket with motor mounted thereon.
Figure 2B:
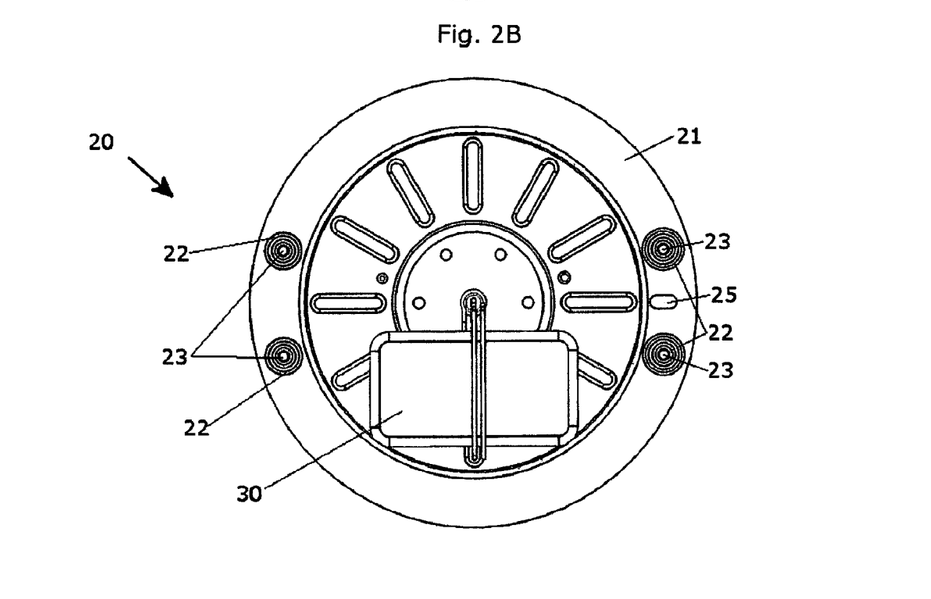
FIG. 2B is a top view of the motor mount bracket of FIG. 2A.

FIG. 2A is an upper perspective view of a novel bracket 20 with remote control receiver 30 and a motor 40 mounted thereon. FIG. 2B is a top view of the motor mount bracket 20 inside remote control receiver of FIG. 2A.

Figures 3, 4:
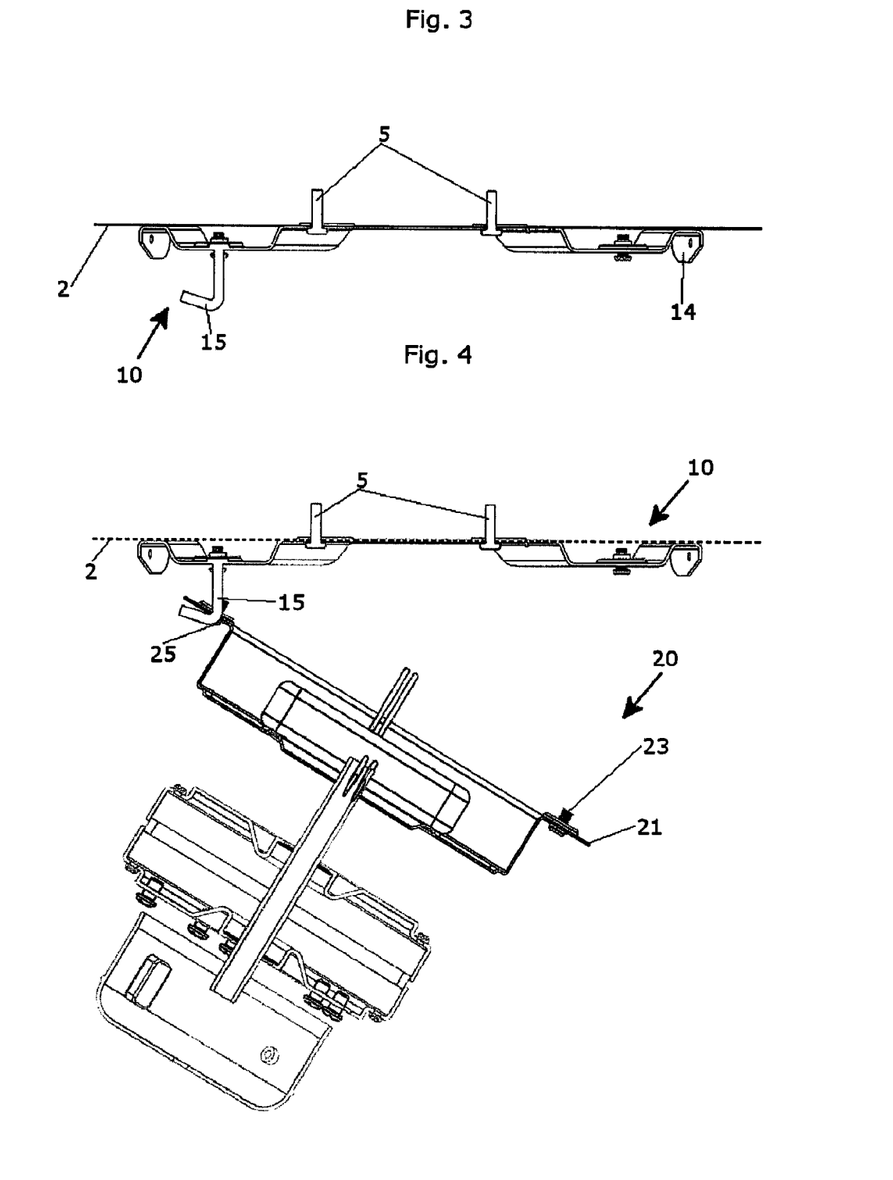
FIG. 3 is a side cross-sectional view of the ceiling mount plate of FIGS. 1A-1B, attached to a ceiling by fasteners extending below a junction box.
FIG. 4 is a cross-sectional view of the motor bracket of FIGS. 2A-2B hooked to the ceiling plate of FIG. 3 to start the attachment process.

FIG. 3 is a side cross-sectional view of the ceiling mount plate 10 of FIGS. 1A-1B, attached to a ceiling 2 by fasteners 5 extending below a conventional junction box in the ceiling.

FIG. 4 is a cross-sectional view of the motor bracket 20 of FIGS. 2A-2B hooked to the ceiling plate 10 of FIG. 3 to start the attachment process.

Figure 5A:
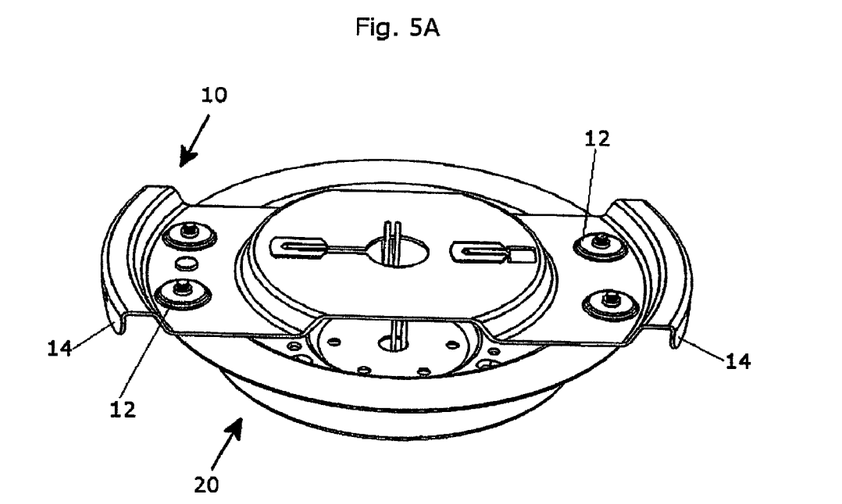
FIG. 5A is an upper perspective view of the ceiling mount plate of the preceding figures with motor bracket attached underneath.
Figure 5B:
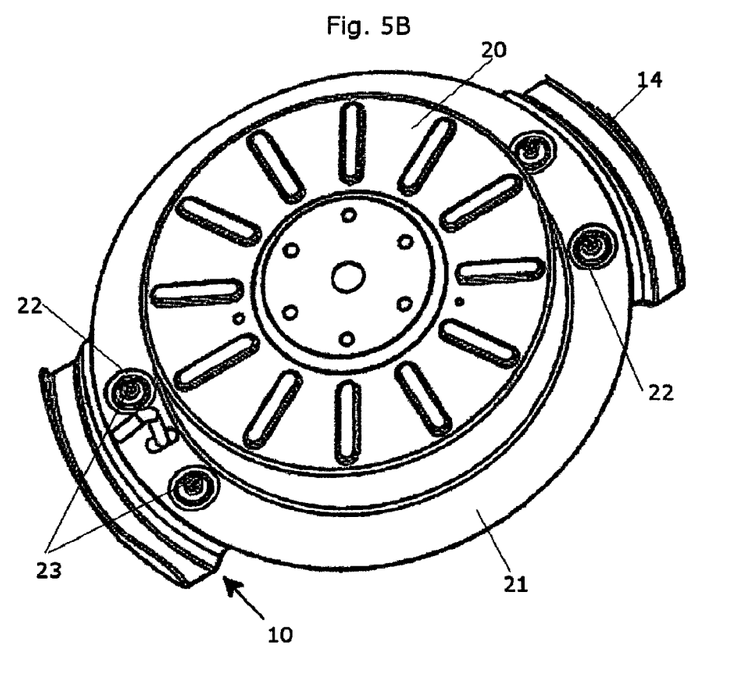
FIG. 5B is a bottom perspective view of the ceiling mount plate with attached motor bracket of FIG. 5A.
Figure 5C:
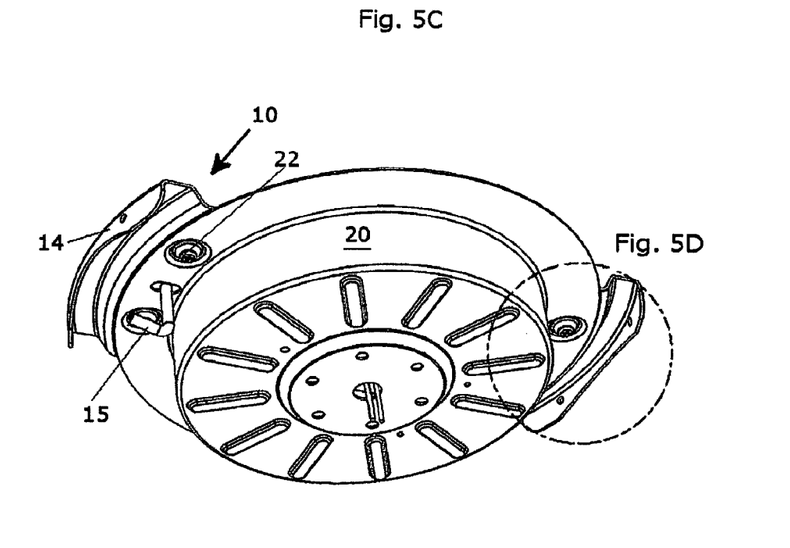
FIG. 5C is another bottom perspective view of the ceiling mount plate with attached motor bracket of FIG. 5B.
Figure 5D:
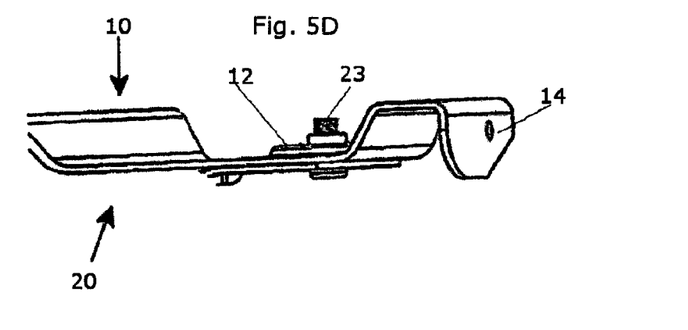
FIG. 5D is an enlarged view of a captive fastener in the motor bracket attached to the ceiling mount plate of FIG. 5D.

FIG. 5A is an upper perspective view of the ceiling mount plate 10 of the preceding figures with motor bracket 20 attached underneath. FIG. 5B is a bottom perspective view of the ceiling mount plate 10 with attached motor bracket 20 of FIG. 5A. FIG. 5C is another bottom perspective view of the ceiling mount plate 10 with attached motor bracket 20 of FIG. 5B. FIG. 5D is an enlarged view of a captive fastener 23 in the motor bracket 20 attached to the ceiling mount plate 10 of FIG. 5D.

Figures 6A, 6C:
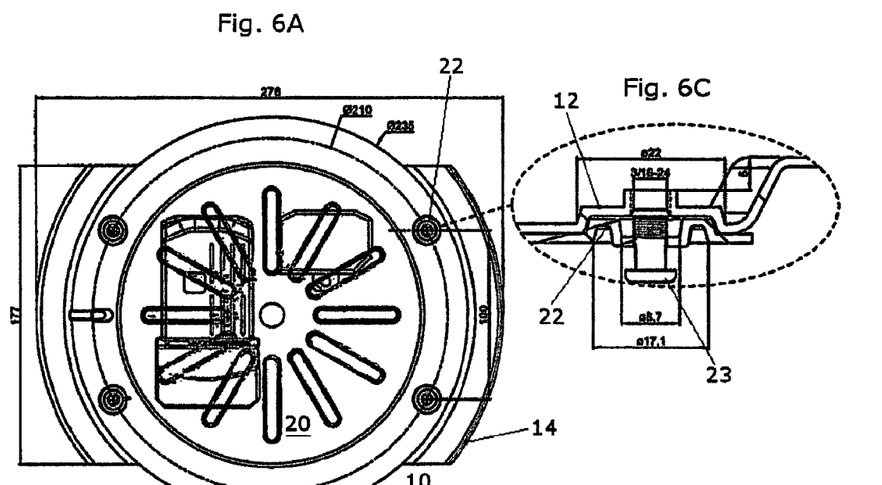
FIG. 6A is a bottom view of the ceiling mount plate with attached motor bracket of FIGS. 5A-5C.
FIG. 6C is an enlarged view of a captive fastener in the motor bracket about to be attached to the ceiling mount plate of FIG. 6A.
Figure 6B:
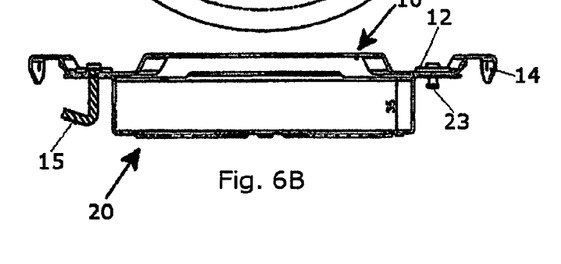
FIG. 6B is a side view of the ceiling mount plate with attached motor bracket of FIG. 6A.

FIG. 6A is a bottom view of the ceiling mount plate 10 with attached motor bracket 20 of FIGS. 5A-5C. FIG. 6B is a side view of the ceiling mount plate 10 with attached motor bracket 20 of FIG. 6A. FIG. 6C is an enlarged view of a captive fastener 23 in the motor bracket 20 about to be attached to the ceiling mount plate 10 of FIG. 6A.

Referring to FIGS. 1A-6C, the invention can include a ceiling mount plate 10, and a motor bracket 20 for flush mounting a ceiling fan, such as a hugger fan to a ceiling.

The ceiling mount plate 10 can be generally rectangular with curved outer edges with downwardly extending rim edges 14, or disc shape with a raised mid-portion having noise isolation pads 17 on top of and/or below the mid-portion of the plate 10. Noise isolation pads 17 can be attached to keyhole slots 16.

Along an outer perimeter of the plate 10 can be a plurality of through-holes 13 within alignment receptacles 12 for use with the captive fasteners 23 which will be discussed in more detail later. About each of the fastener through-holes 13 can be indentations 12 underneath the plate 10 which can form female tab receptacles 12 for the raised tabs 22 on the motor bracket 20. Underneath the plate 10 can be a single downwardly protruding hook 15.

Noise isolation pads 17, such as but not limited to rubber isolation pads, can be mounted to by sliding about keyhole slots 16 in the ceiling plate 10.

The motor bracket 20 can have an upper ring portion forming a horizontal rim 21 with a plurality of captive fasteners 23 supported within upwardly raised alignment type alignment tabs 22, which can have raised dimple and/or washer shapes. The captive fasteners 23 can include but are not limited to screws and bolts, having threaded ends with the screw heads exposed underneath the rim 21 of the bracket 20. The motor bracket 20 can be attached to a motor 40 on a flush mountable ceiling fan.

For installation, the ceiling plate 10 can be pre-mounted to a ceiling 2 by sliding and locking the keyhole slots 16 to downwardly extending enlarged headed fasteners extending below an electrical junction type box. Central opening 18 can have wires that can protrude through the ceiling plate 10. The noise isolation pads 17 can decrease any noise effects when the ceiling plate 10 is directly attached to metal such as screw or bolt heads 5 extending below the junction box.

The installer can initially hang the motor bracket 20 by positioning a through-hole (slot) 25 on an edge of the bracket 20 to the end of a downwardly extending hook 15 which is attached to the ceiling plate 10. The installer can then make the electrical connections between the hanging motor bracket 20 and junction box wires passing through the opening 18 in the ceiling plate 10.

Next, the installer can raise up the free end hanging portion of the motor bracket 20, and slide the upper surface of the raised alignment tabs 22 of the bracket 20 over the bottom surface of the ceiling plate 10 until each of the alignment tabs 22 move into each of the female alignment receptacles 12 underneath the ceiling plate 10. The alignment tabs 22 align the motor bracket 20 with the ceiling plate 10 to create a secure, wobble free connection.

Next, the installer can easily use a manual or power screwdriver or other tool to drive the captive fasteners (screws or bolts) into the through-holes 13 from the motor bracket 20 into the ceiling plate 10 so that the bracket 20 is securely attached to the ceiling plate 10. The noise isolation pads 17 on the ceiling plate 10 can also be used between the ceiling plate 10 and portions of the bracket 20 wherein these parts abut each other to further decrease undesirable noise effects when running the ceiling fan.

Figure 7:
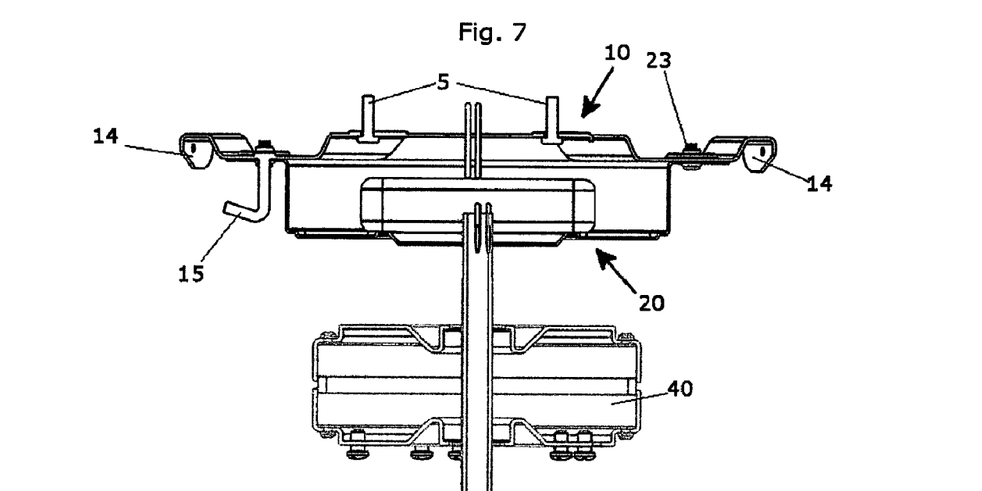
FIG. 7 is another side view of the ceiling mount plate with attached motor bracket of FIG. 6B with a motor attached to the mount bracket.

FIG. 7 is another side view of the ceiling mount plate 10 with attached motor bracket 20 of FIG. 6B with a motor 40 attached to the mount bracket 20.

Figure 8:
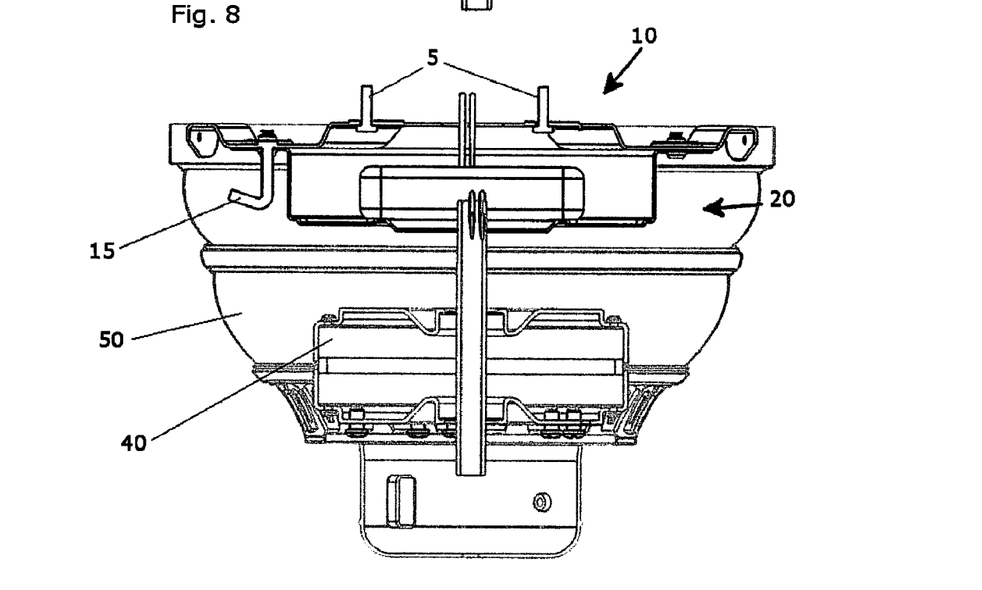
FIG. 8 is a side cross-sectional view of the ceiling mount plate with attached motor bracket and motor of FIG. 7 with a canopy motor housing thereon.

FIG. 8 is a side cross-sectional view of the ceiling mount plate 10 with attached motor bracket 20 and motor 40 of FIG. 7 with a canopy motor housing 50 attached thereon.

Figure 9:
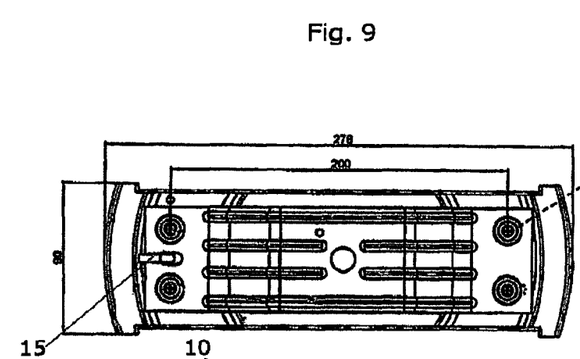
FIG. 9 is a bottom view of another motor bracket flush mounted to a ceiling plate.
Figure 10:
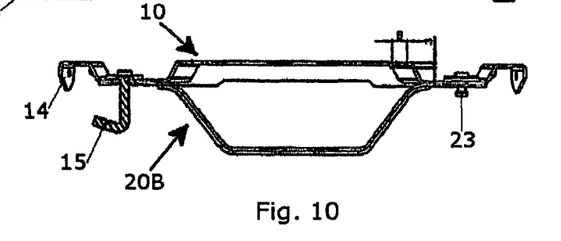
FIG. 10 is a side cross-sectional side view of FIG. 9 showing the motor bracket mounted to the ceiling plate.
Figure 11:
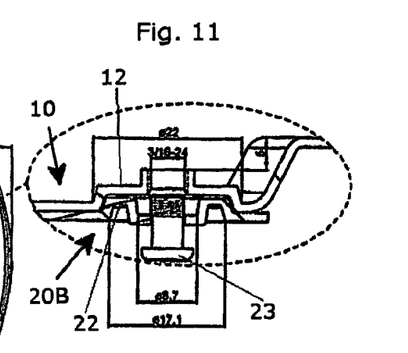
FIG. 11 is an enlarged view of a captive fastener in the motor bracket about to be attached to the ceiling mount plate of FIG. 9.

FIG. 9 is a bottom view of another motor bracket 20B flush mounted to a ceiling plate 10. FIG. 10 is a side cross-sectional side view of FIG. 9 showing the motor bracket 20B mounted to the ceiling plate 10. FIG. 11 is an enlarged view of a captive fastener 23 in the motor bracket 20 about to be attached to the ceiling mount plate 10 of FIG. 9. This embodiment can function and operate similar to the previously described ceiling plate 10 and motor mount bracket 20.

While the invention is shown with the female tab receptacles in the ceiling plate, and the raised alignment tabs on the motor bracket, the invention can be used with the female tab receptacles on the rim of the motor mount bracket and the raised alignment tabs extending below the ceiling mount plate.

While the hook is shown on the ceiling plate, and hanging slot on the motor bracket, the hook can be on the motor bracket and the hanging slot on the ceiling plate.

Although the preferred embodiments show captive fasteners and alignment tabs and receptacles used with a ceiling fan motor bracket and ceiling plate, the invention can be used with other applications. For example, other components, such as but not limited to ceiling fan motor housings and/or shades and/or other components can also be fastened to ceiling plates and/or ceiling brackets, and the like with the novel invention features.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A system for flush mounting a ceiling fan motor to a ceiling, comprising:
   a plate mounted to a ceiling having a plurality of fastener holes adjacent to a perimeter edge of the plate; and
   a bracket attached to a ceiling fan motor, the bracket having a plurality of captive fasteners adjacent to a perimeter edge of the bracket; and
   alignment tabs and receptacles for aligning the bracket with the plate so that the captive fasteners are aligned with the fastener holes, the alignment tabs are underneath the plate, which are mateable with the receptacles on the upper surface of the bracket, wherein aligning the captive fasteners with the fastener holes, allows for attaching the bracket to the plate by rotating the captive fasteners into the fastener holes.

2. The system of claim 1, wherein the alignment tabs include raised portions adjacent to the captive fasteners on an upper surface of the bracket, which are mateable with indentation portions underneath the plate.

3. The system of claim 1, further comprising:
   a hook on the plate and a hanging slot on the bracket for allowing the bracket to hang from the plate.

4. The system of claim 1, further comprising:
   a hook on the bracket and a hanging slot on the plate for allowing the bracket to hang from the plate.

5. The system of claim 1, wherein the captive fasteners include:
   screws.

6. The system of claim 1, wherein the captive fasteners include:
   bolts.

7. The system of claim 1, further comprising:
   an isolation pad on the plate for providing noise isolation between the plate and a ceiling attachment point for decreasing noise when operating the ceiling fan motor.

8. The system of claim 7, wherein the plate includes:
   keyhole slots for mounting the plate to a ceiling attachment fastener, with the isolation pad about the keyhole slots.

9. The system of claim 1, further comprising:
   a downwardly protruding rim portion about the perimeter edge of the plate.

10. A method of flush mounting a ceiling fan motor to a ceiling mounted plate, comprising the steps of:
    providing a plate mounted to a ceiling having a plurality of fastener holes adjacent to an outer perimeter edge;
    providing a motor bracket with a plurality of captive fasteners adjacent to an outer perimeter edge;
    providing alignment tabs on an upper surface of the motor bracket;
    providing mateable alignment receptacles for the alignment tabs, the alignment receptacles being underneath the ceiling mounted plate;
    aligning the motor bracket to the plate by aligning the tabs into the respective receptacles, so that the captive fasteners are aligned to the fastener holes; and
    attaching the motor bracket to the ceiling mounted plate by rotating the captive fasteners into the fastener holes.

11. The method of claim 10, further comprising the step of:
    hooking the motor bracket to the plate with a hook and a slot.

12. The method of claim 10, wherein the step of providing the motor bracket with the plurality of captive fasteners, includes the step of:
    providing screws as the captive fasteners.

13. The method of claim 10, wherein the step of providing the motor bracket with the plurality of captive fasteners, includes the step of:
    providing bolts as the captive fasteners.

14. The method of claim 10, further comprising the steps of:
    providing keyhole slots in the plate; and
    providing isolation pads about the keyhole slots to decrease noise when the plate is attached to a ceiling attachment fastener.

15. The method of claim 10, further comprising the step of:
    providing a downwardly protruding rim portion about the perimeter edge of the plate.

16. A method of flush mounting a ceiling fan motor to a ceiling mounted plate, comprising the steps of:
    providing a plate mounted to a ceiling having a plurality of fastener holes adjacent to an outer perimeter edge;
    providing a motor bracket with a plurality of captive fasteners adjacent to an outer perimeter edge;
    providing alignment tabs on a lower surface of the plate;
    providing mateable alignment receptacles on the bracket;
    aligning the motor bracket to the plate by aligning the tabs into the respective receptacles, so that the captive fasteners are aligned to the fastener holes; and
    attaching the motor bracket to the ceiling mounted plate by rotating the captive fasteners into the fastener holes.

17. The method of claim 16, wherein the aligning step includes the step of:
    positioning the bracket against the plate to align the captive fasteners with the fastener holes.

18. The method of claim 16, further comprising the step of:
    providing a downwardly protruding rim portion about the perimeter edge of the plate.

19. A system for flush mounting a ceiling fan motor to a ceiling, comprising:
    a plate mounted to a ceiling having a plurality of fastener holes adjacent to a perimeter edge of the plate;
    a bracket attached to a ceiling fan motor, the bracket having a plurality of captive fasteners adjacent to a perimeter edge of the bracket; and
    alignment tabs and receptacles for aligning the bracket with the plate so that the captive fasteners are aligned with the fastener holes, the alignment tabs on a lower surface of the plate and the receptacles are on the bracket, wherein aligning the captive fasteners with the fastener holes, allows for attaching the bracket to the plate by rotating the captive fasteners into the fastener holes.

20. The system of claim 19, further comprising:
    a downwardly protruding rim portion about the perimeter edge of the plate.

* * * * *